US012208572B2

United States Patent
Günther et al.

(10) Patent No.: US 12,208,572 B2
(45) Date of Patent: Jan. 28, 2025

(54) METHOD AND DEVICE FOR PRODUCING 3D SHAPED PARTS USING LAYERING TECHNOLOGY, AND CONTROLLABLE POWDER ROLLER

(71) Applicant: VOXELJET AG, Friedberg (DE)

(72) Inventors: Daniel Günther, Munich (DE); Christoph Scheck, Augsburg (DE); Lisa Brüller, Augsburg (DE); Ingo Ederer, Geltendorf (DE)

(73) Assignee: VOXELJET AG, Friedberg (DE)

( * ) Notice: Subject to any disclaimer, the term of this patent is extended or adjusted under 35 U.S.C. 154(b) by 0 days.

(21) Appl. No.: 16/062,269

(22) PCT Filed: Dec. 19, 2016

(86) PCT No.: PCT/DE2016/000436
§ 371 (c)(1),
(2) Date: Jun. 14, 2018

(87) PCT Pub. No.: WO2017/108019
PCT Pub. Date: Jun. 29, 2017

(65) Prior Publication Data
US 2018/0369910 A1    Dec. 27, 2018

(30) Foreign Application Priority Data

Dec. 21, 2015 (DE) .................... 10 2015 016 464.3

(51) Int. Cl.
*B29C 64/165* (2017.01)
*B22F 3/00* (2021.01)
(Continued)

(52) U.S. Cl.
CPC ............ *B29C 64/165* (2017.08); *B22F 3/004* (2013.01); *B22F 10/28* (2021.01); *B22F 12/13* (2021.01);
(Continued)

(58) Field of Classification Search
CPC .................. B22F 3/1055; B22F 3/004; B22F 2003/1056; B22F 2003/1058;
(Continued)

(56) References Cited

U.S. PATENT DOCUMENTS 3,668,997 A    6/1972   Ratowsky
3,913,503 A    10/1975  Becker
(Continued)

FOREIGN PATENT DOCUMENTS

AU    720255 B2      5/2000
CN    101146666 A    3/2008
(Continued)

OTHER PUBLICATIONS

US 4,937,420 A, 06/1990, Deckard (withdrawn)
(Continued)

*Primary Examiner* — S. Behrooz Ghorishi
(74) *Attorney, Agent, or Firm* — The Dobrosin Law Firm, P.C.

(57) ABSTRACT

The invention relates to a method for producing three-dimensional parts by means of a controllable particulate material roll.

21 Claims, 16 Drawing Sheets

(51) Int. Cl.
  *B22F 10/14* (2021.01)
  *B22F 10/28* (2021.01)
  *B22F 12/13* (2021.01)
  *B22F 12/41* (2021.01)
  *B22F 12/55* (2021.01)
  *B22F 12/63* (2021.01)
  *B22F 12/67* (2021.01)
  *B22F 12/70* (2021.01)
  *B29C 41/00* (2006.01)
  *B29C 64/209* (2017.01)
  *B29C 64/214* (2017.01)
  *B29C 64/218* (2017.01)
  *B29C 64/268* (2017.01)
  *B33Y 10/00* (2015.01)
  *B33Y 30/00* (2015.01)

(52) U.S. Cl.
  CPC ............ *B22F 12/41* (2021.01); *B22F 12/67* (2021.01); *B22F 12/70* (2021.01); *B29C 41/006* (2013.01); *B29C 64/209* (2017.08); *B29C 64/214* (2017.08); *B29C 64/218* (2017.08); *B29C 64/268* (2017.08); *B33Y 10/00* (2014.12); *B33Y 30/00* (2014.12); *B22F 10/14* (2021.01); *B22F 12/55* (2021.01); *B22F 12/63* (2021.01); *Y02P 10/25* (2015.11)

(58) Field of Classification Search
  CPC ... B29C 64/214; B29C 64/218; B29C 64/209; B29C 64/268; B29C 41/006; B29C 64/165; B33Y 10/00; B33Y 30/00; Y02P 10/25; Y02P 10/295
  See application file for complete search history.

(56) References Cited

U.S. PATENT DOCUMENTS

| | | |
|---|---|---|
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,269,982 A | 12/1993 | Brotz |
| 5,284,695 A | 2/1994 | Barlow et al. |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,824,250 A | 10/1998 | Whalen |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |

(56) References Cited

U.S. PATENT DOCUMENTS

| | | |
|---|---|---|
| 6,554,600 B1 | 4/2003 | Hofmann et al. |
| 6,596,224 B1 | 7/2003 | Sachs et al. |
| 6,616,030 B2 | 9/2003 | Miller |
| 6,649,121 B1 | 11/2003 | Hamamoto |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 6,905,645 B2 | 6/2005 | Iskra |
| 6,972,115 B1 | 12/2005 | Ballard |
| 7,087,109 B2 | 8/2006 | Bredt et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,387,359 B2 | 6/2008 | Hernandez et al. |
| 7,455,805 B2 | 11/2008 | Oriakhi et al. |
| 7,497,977 B2 | 3/2009 | Nielsen et al. |
| 7,578,958 B2 | 8/2009 | Patel et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 7,887,264 B2 | 2/2011 | Naunheimer et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1* | 2/2004 | Leyden ............... B29C 64/165 428/195.1 |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1* | 9/2004 | Ederer ............... B33Y 40/00 427/355 |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0046067 A1 | 3/2005 | Oriakhi |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0276976 A1 | 12/2005 | Pfeifer et al. |
| 2005/0280185 A1 | 12/2005 | Russell et al. |
| 2005/0283136 A1 | 12/2005 | Skarda |
| 2006/0012058 A1 | 1/2006 | Hasei |
| 2006/0103054 A1 | 5/2006 | Pfeifer et al. |
| 2006/0105102 A1* | 5/2006 | Hochsmann ............ B29C 41/36 427/180 |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0069994 A1 | 3/2008 | Kanda |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1* | 10/2008 | Ederer ............... B22F 10/10 118/57 |
| 2008/0299321 A1 | 12/2008 | Ishihara |
| 2009/0068376 A1* | 3/2009 | Philippi ............... B29C 64/153 427/532 |
| 2009/0283501 A1 | 11/2009 | Erikson et al. |
| 2010/0007048 A1 | 1/2010 | Schweininger |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0212584 A1 | 8/2010 | Ederer et al. |
| 2010/0207288 A1 | 9/2010 | Enrico |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |

(56) References Cited

U.S. PATENT DOCUMENTS

| | | | |
|---|---|---|---|
| 2014/0212677 A1 | 7/2014 | Gnuchtel et al. | |
| 2014/0227123 A1 | 8/2014 | Gunster | |
| 2014/0236339 A1 | 8/2014 | Fagan | |
| 2014/0271961 A1 | 9/2014 | Khoshnevis | |
| 2014/0306379 A1 | 10/2014 | Hartmann et al. | |
| 2015/0042018 A1 | 2/2015 | Gunther et al. | |
| 2015/0110910 A1 | 4/2015 | Hartmann et al. | |
| 2015/0190968 A1* | 7/2015 | Griszbacher | B33Y 50/02 264/40.6 |
| 2015/0224718 A1 | 8/2015 | Ederer et al. | |
| 2015/0266238 A1* | 9/2015 | Ederer | B29C 67/0077 264/460 |
| 2015/0273572 A1 | 10/2015 | Ederer et al. | |
| 2015/0290881 A1 | 10/2015 | Ederer et al. | |
| 2015/0375419 A1 | 12/2015 | Gunther et al. | |
| 2016/0318251 A1 | 3/2016 | Ederer et al. | |
| 2016/0215092 A1* | 7/2016 | Vanelli | B29B 13/021 |
| 2016/0263828 A1 | 9/2016 | Ederer et al. | |
| 2016/0303762 A1 | 10/2016 | Gunther | |
| 2016/0311167 A1 | 10/2016 | Gunther et al. | |
| 2016/0311210 A1 | 10/2016 | Gunther et al. | |
| 2017/0050378 A1 | 2/2017 | Ederer | |
| 2017/0106595 A1 | 4/2017 | Gunther et al. | |
| 2017/0151727 A1 | 6/2017 | Ederer et al. | |
| 2017/0157852 A1 | 6/2017 | Ederer et al. | |
| 2017/0165866 A1* | 6/2017 | Gunster | B29C 64/165 |
| 2017/0182711 A1 | 6/2017 | Gunther et al. | |
| 2017/0210037 A1 | 7/2017 | Ederer et al. | |
| 2017/0297263 A1 | 10/2017 | Ederer et al. | |
| 2017/0305139 A1 | 10/2017 | Hartmann | |
| 2017/0355137 A1 | 12/2017 | Ederer et al. | |
| 2018/0079133 A1 | 3/2018 | Ederer et al. | |
| 2018/0141271 A1 | 5/2018 | Gunter et al. | |
| 2018/0339452 A1 | 11/2018 | Heymel et al. | |
| 2018/0369910 A1 | 12/2018 | Gunter et al. | |
| 2019/0047218 A1 | 2/2019 | Ederer et al. | |
| 2019/0084229 A1 | 3/2019 | Gunther | |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4325573 A1 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 102013004940 A1 * | 4/2014 ........... B29C 64/153 |
| EP | 0361847 B1 | 4/1990 |
| EP | 1415792 | 5/2004 |
| EP | 1457590 A | 9/2004 |
| EP | 1600281 B1 | 11/2005 |
| EP | 1737646 B1 | 5/2007 |
| EP | 1879731 B1 | 2/2010 |
| GB | 2297516 A | 8/1996 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 01/40866 A2 | 6/2001 |
| WO | 02/083323 A2 | 10/2002 |
| WO | 2004/014637 A1 | 2/2004 |
| WO | 2005/090055 A1 | 9/2005 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |

OTHER PUBLICATIONS

"Poly(vinyl chloride) plasticized with mixtures of succinate di-esters—synthesis and characterization" Amanda Stuart, Dale J. LeCaptain ⇅, Choon Y. Lee, Dillip K. Mohanty, European Polymer Journal 49 (2013) 2785-2791 (Year: 2013).*

International Search Report and Written Opinion, PCT Application No. PCT/DE2016/000436, dated May 26, 2017.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, pp. 130-133.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine with Brief Summary Feb. 22, 2005.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

Williams, "Feasibility Study of Investment Casting Pattern Design by Means of Three Dimensional Printing", Department of Mechanical Engineering, abstract only; Sep. 25, 2001.

Armin Scharf, "Erster 3D-Endlosdrucker", zwomp.de, http://www.zwomp.de/2012/11/06/voxeljet-endlosdrucker/ dated Nov. 6, 2012.

Screen shots of URL: http://www.youtube.com/watch?v=hgIrNXZjIxU taken in approximately 5 second intervals on Nov. 12, 2015.

Jacobs et al., 2005 SME Technical Paper, title "Are QuickCast Patterns Suitable for Limited Production?".

* cited by examiner

Prior Art

Prior Art

METHOD AND DEVICE FOR PRODUCING 3D SHAPED PARTS USING LAYERING TECHNOLOGY, AND CONTROLLABLE POWDER ROLLER

CLAIM OF PRIORITY

This application is a national phase filing under 35 USC § 371 from PCT Application serial number PCT/DE2016/000436 filed on Dec. 19, 2016 and claims priority therefrom. This application further claims priority from German Patent Application DE 10 2015 016464.3 filed on Dec. 21, 2015. PCT/DE2016/000436 and DE 10 2015 016 464.3 are each incorporated by reference in its entirety.

The invention relates to a method and a device for producing 3D models by means of a layer construction technique.

European Patent EP 0 431 924 B1 describes a process for producing three-dimensional objects, based on computer data. In the process, a thin layer of particulate material is deposited on a platform and has a binder material selectively printed thereon by means of a print head. The particulate region with the binder printed thereon bonds and solidifies under the influence of the binder and, optionally, an additional hardener. Next, the platform is lowered by one layer thickness into a construction roll and provided with a new layer of particulate material, the latter also being printed on as described above. These steps are repeated until a certain desired height of the object is achieved. Thus, the printed and solidified regions form a three-dimensional object.

Upon completion, the object made of solidified particulate material is embedded in loose particulate material, from which it is subsequently freed. For this purpose, a suction device may be used, for example. This leaves the desired objects which then have to be freed from any residual powder, e.g. by brushing it off.

Other powder-based rapid prototyping processes (also referred to as layered construction of models or layer construction techniques), e.g. selective laser sintering or electron beam sintering, work in a similar manner, also applying loose particulate material layer by layer and selectively solidifying it with the help of a controlled physical source of radiation.

In the following, all these processes will be understood to be covered by the term "three-dimensional printing methods" or "3D printing methods".

3D printing on the basis of pulverulent materials and introduction of liquid binders is the quickest method among the layer construction techniques.

This method allows various particulate materials, including polymeric materials, to be processed. However, it has the disadvantage that the particulate material bed cannot exceed a certain bulk density, which is usually 60% of the particle density. The strength of the desired parts significantly depends on the achieved density, however. Insofar it would be required here for high strength of the components to add 40% or more by volume of the particulate material in the form of liquid binder. This is not only a relatively time-consuming process due to the single-droplet input, but it also causes many process-related problems, which are given, for example, by the inevitable shrinkage of the liquid volume during solidification.

In another embodiment, which is known in the art as "high-speed sintering", solidification of the particulate material is effected by input of infrared radiation. The particulate material is thus bonded physically by a fusing process. In this case, advantage is taken of the comparatively poor absorption of thermal radiation in colorless plastic materials. Said absorption can be increased multiple times by introducing an IR acceptor (absorber) into the plastic material. The IR radiation can be introduced by various means, e.g. a bar-shaped IR lamp, which is moved evenly over the construction field. Selectivity is achieved by the specific printing of the respective layer with an IR acceptor.

In the printed locations, the IR radiation thereby couples much better into the particulate material than in the unprinted regions. This results in selective heating within the layer beyond the melting point and, consequently, to selective solidification. This process is described, for instance, in EP1740367B1 and EP1648686B1 and will be abbreviated below as HSS.

Various materials are known from the laser sintering process which can be processed with this method as well. By far the most important material in this context is polyamide 12. There are several manufacturers for this material. The strengths achieved are excellent for layer construction methods.

The material is available as a fine powder which can be processed directly in this quality. Due to the manufacturing process, however, costs are high and may exceed the cost of standard polyamide by a factor of 20-30.

In high speed sintering according to the prior art, just as in laser sintering, the powder is brought to a temperature near the melting point of the material for processing. This causes the powder to "age" and limits its use in subsequent processes. A low recycling rate results, which has a negative effect on process costs.

For example, in this respect, it is known from US 20050263933 A1 to introduce the powder into the process chamber at 90° C. and then to heat it to even higher temperatures in the process chamber. This is necessary, in particular, because upon applying a new layer of cold, fresh powder, the already existing upper layer undergoes a thermal shock. Too great a temperature difference will trigger crystallization of the powder, resulting in distortion of the part. Therefore, any freshly applied powder must be heated to the process temperature (just below the melting point of the respective polymer) as quickly as possible.

The precision of the parts is significantly influenced by process control. Thus, the homogeneity of parameters such as powder bed density and temperature in the construction space is decisive.

The known methods of high-speed sintering and laser sintering have a multitude of disadvantages concerning, on the one hand, the recycling rate and, on the other hand, process costs, consequently increasing the cost per piece and making it rather expensive. In particular, the aging of the powder is a crucial problem, and the resulting low recycling rate is a great hindrance for this process to become more widespread. Currently, approx. 50% of the powder not incorporated in parts has to be replaced after a process. At powder prices of approx. €80/kg and with construction volumes of several hundred liters, this requires high financial investments.

One approach to solving the process-related problems, thereby reducing costs, is the use of less expensive powders. However, this approach has narrow limits, because most powders do not have a sufficient "sintering window" to be safely processed. This means that stable process parameters are hard to find for these powders.

Another approach is to chemically limit powder aging. In this case, machines flushed with nitrogen are common in laser sintering, for example. This can prevent powder oxidation. However, for process-related reasons alone, aging cannot be curbed entirely, because part of the solidification reaction occurs by a secondary reaction of the polymer. Curbing this secondary reaction would mean essential limitations in strength.

One problem with known high-speed sintering methods is the adjustment of advantageous process conditions, such as, for example, the temperature windows with respect to the particulate materials used. The high-speed sintering method combines a great number of process parameters and the 3D printing machines used therein have a great number of constructive features and components, which makes it difficult to combine suitable components and adjust an advantageous or improved process sequence allowing improved process conditions. In many cases, it is difficult to determine what constructive changes are required in order to achieve acceptable process results and obtain high-quality 3D parts and/or optimize the process. Furthermore, complex cooling mechanisms are required for the print head in order to implement a sintering machine using inkjet technology in a hot construction space. Excessively high temperatures will damage the print head. Therefore, continuous operation in a hot construction space is not easy to achieve.

Moreover, the axial design, in particular in sintering machines using inkjet technology, is very complex due to the required separation of the hot construction space.

In addition, what all sintering machines have in common is that the required insulation and shielding of the construction space is generally complex and expensive.

It should be noted that the energy loss resulting from heat loss in the process chamber does not just lead to higher energy costs. The time it takes to reach the process temperature in the construction space at which the printing process can be started reduces the effective output of parts to a great extent. Heating up can take up to several hours in commercially available sintering machines. Since parts of the machine continue to heat up during the printing process, the temperature of the process chamber must be adjusted by a complex control system, because otherwise the changing ambient conditions will result in different properties of the parts during the printing process. Inkjet technologies used in the process also result in inhomogeneities in the properties of the molded articles due to the temperature-dependent change in the rheological properties of the absorber fluid.

Overall, the aforementioned disadvantages of the prior art have a negative effect on the scalability of the process. As a result, the production cost of larger machines increases considerably. Moreover, upwards of a certain size, convection and heat conduction make it very difficult to achieve homogeneous temperature distribution in the process chamber, thus limiting the machine size.

It was therefore an object of the present invention to provide constructional means allowing an improved HSS process or at least improving or altogether avoiding the disadvantages of the prior art.

Another object of the invention was to provide improved process conditions in the HSS process or to achieve improved process results by specific selection of device components or/and adjustment of process conditions.

Another problem and a further disadvantage in the manufacture of 3D molded parts by HSS are temperature gradients which occur across the surface of the part to be manufactured and in the construction material surrounding the part up to the peripheral areas of the construction platform. This involves disadvantages that either interfere with the process itself or result in drawbacks to quality, e.g. curling, warping, inaccuracy of the molded part or increased wastage.

In particular, even and temperature-controlled construction material application of the powder is a challenge in prior art methods.

During the HSS process, the surface temperature of the powder bed is cyclically increased and decreased selectively, and at the end of the construction process, the finished molded part is cooled off completely.

Ideally, the temperature in the molded part to be constructed should be constantly at a value of just above the solidification temperature, if possible, and should vary in the construction zone only within a narrow temperature band which exceeds the melting point of the powder. Due to the emission and thermal conduction into the surrounding particulate material, the edge of the molded part cools off quicker than internal regions, which results in undesired temperature differences in the molded part, along with the above-mentioned disadvantages.

It was another object of the present invention to provide a method which allows constant, controllable and/or essentially uniform temperature distribution to be achieved in the 3D molded part to be produced and/or in the construction material surrounding the molded part during the construction process and/or to avoid, or at least reduce, excessively high and unfavorable temperature gradients across the construction surface.

For application of the powder for the sintering process, DE102006055050A1, DE102006023485A1, DE102013206458A1 and DE102005022308B4 disclose a blade configured as a spin coater. The latter is guided over the powder surface in a pivoting movement (comparable to a windshield wiper) and pushes the particulate material along in front of it as a type of powder roll. It has turned out as problematic again, in this case, that the construction space has to be kept at a high temperature so that the powder can be preheated without cooling off and the powder roll which the coater moves along in front of it does not cool down too much during material application.

Moreover, concerning the powder roll, it has proved problematic that the rotary movement results in a higher coating speed along its radius, which results in differences in quality among the molded articles, depending on their location.

The powder roll usually becomes smaller during the sweeping movement, so that heat dissipation is greater on the side of the large roll (towards the center of rotation). The powder roll may also become smaller along the blade. These temperature differences, depending on the position of the molded article, result in differences in quality between the molded articles produced.

Therefore, it is a still further object of the invention to adapt the properties of the powder roll such that it does not cause any differences in quality in the part to be manufactured.

BRIEF SUMMARY OF THE DESCRIPTION

In one aspect, the disclosure relates to a method for producing three-dimensional parts, wherein particulate material is applied, layer by layer, onto a construction field, an absorber is selectively applied, the areas with the absorber are solidified by energy input, and these steps are repeated until the three-dimensional part or parts is/are obtained, wherein the particulate material is applied by means of a recoater and the absorber is selectively applied by a print head, the particulate material is solidified by energy input means, wherein the recoater is an oscillating blade recoater having a temperature of 70° C. to 155° C., the particulate material is applied by generating a particulate material roll in front of the recoater in the coating direction, the diameter of the particulate material roll is adjustable, and the particulate material is heated to or kept at a temperature of 155° C. to 180° C. by energy input means during application onto the construction field.

In another aspect, the disclosure relates to a device for carrying out a 3D printing method, said device comprising: a. a construction field, b. an oscillating blade recoater with a heating element, c. a print head, d. one or more energy input means, wherein an energy input means is mounted on or next to the recoater so as to be movable along with the latter and, preferably, conducting means for adjusting the construction space temperature by conducting an air flow through the construction space.

BRIEF DESCRIPTION OF THE DRAWINGS

Exemplary embodiments of the invention are shown in the drawings, wherein.

DETAILED DESCRIPTION OF THE DISCLOSURE

Figure 1A:
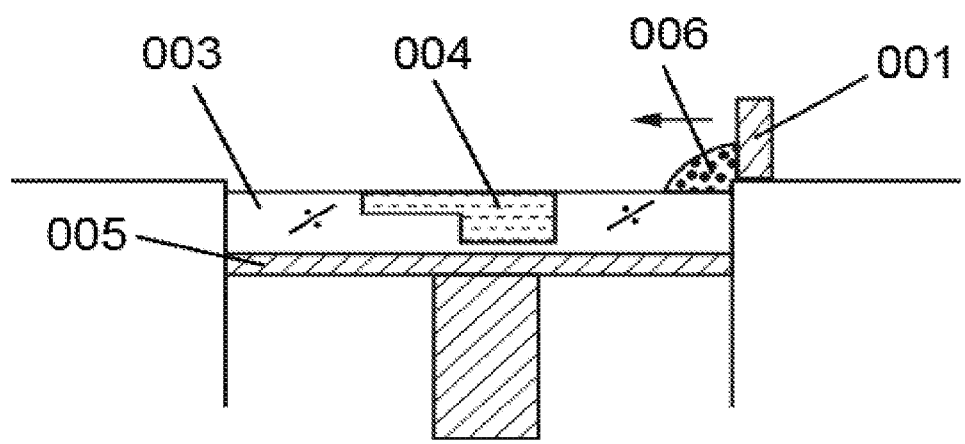
FIG. 1 shows a prior art device for application of particulate material comprising a blade coater, a) is a snapshot at the beginning of the coating process, and b) is a snapshot at the end of the coating process. Obviously, the powder roll is much smaller in b)

According to the invention, an object underlying the application is achieved by specifically combining advantageous building components and process parameters which result in advantageous process results.

According to the invention, further objects underlying the application are achieved in that, in a method for the production of three-dimensional parts, wherein the particulate material is applied, layer by layer, onto a construction field, an absorber is selectively applied, the areas with absorber are solidified, and these steps are repeated until the three-dimensional part or parts is/are obtained, the particulate material is applied by means of a temperature-controllable recoater. Furthermore, it is envisaged that the absorber is selectively applied by a print head and that the particulate material is selectively solidified by energy input means. In this case, the recoater is an oscillating blade recoater set to a temperature of 70° C. to 155° C. The particulate material is applied by generating a particulate material roll in front of the recoater in the coating direction, with the diameter of the particulate material roll being adjustable. The particulate material being applied onto the construction field is heated by energy input means to a temperature of 155° C. to 180° C.

First of all, several terms according to the invention will be explained in more detail below.

A "3D molded part", "molded article" or "part" in the sense of the invention means any three-dimensional object manufactured by means of the method according to the invention or/and the device according to the invention and exhibiting dimensional stability.

"Construction space" is the geometric location where the particulate material bed grows during the construction process by repeated coating with particulate material or through which the bed passes when applying continuous principles. The construction space is generally bounded by a bottom, i.e. the construction platform, by walls and an open top surface, i.e. the construction plane. In continuous principles, there usually is a conveyor belt and limiting side walls. The construction space can also be designed in the form of what is called a job box, which constitutes a unit that can be moved in and out of the device and allows batch production, with one job box being moved out after completion of a process to allow a new job box to be moved into the device immediately, thereby increasing both the production volume and, consequently, the performance of the device.

The "heating phase" refers to heating of the device at the beginning of the process. The heating phase is complete as soon as the actual temperature of the device reaches a stationary value.

The "cooling phase" refers to the time required to cool the particulate material to such an extent that the parts contained therein are not subject to any significant plastic deformation when removing them from the construction space.

The "particulate materials" or "particulate construction materials" or "construction materials" of use herein may be any materials known for powder-based 3D printing, in particular polymers, ceramics and metals. The particulate material is preferably a free-flowing powder when dry, but may also be a cohesive, cut-resistant powder or a particle-charged liquid. In this specification, particulate material and powder will be used synonymously.

The "particulate material application" is the process of generating a defined layer of powder. This may be done either on the construction platform or on an inclined plane relative to a conveyor belt in continuous principles. The particulate material application will also be referred to below as "coating" or "recoating".

"Selective liquid application" in the sense of the invention may be effected after each particulate material application or irregularly, depending on the requirements for the molded article and for optimization of the molded article production, e.g. several times with respect to particulate material application. In this case, a sectional image of the desired article is printed.

The "device" used for carrying out the method according to the invention may be any known 3D-printing device which includes the required parts. Common components include coater, construction field, means for moving the construction field or other components in continuous processes, metering devices and heating and irradiating means and other components which are known to the person skilled in the art and will therefore not be described in detail herein.

The "absorber" in the sense of this invention is a medium which can be processed by an inkjet print head or any other device working in a matrix-like manner, which medium enhances the absorption of radiation for local heating of the construction material. The absorber may also be in the form of particles, e.g. black toner. Absorbers may be applied uniformly or selectively, in different amounts. For example, the absorber may be applied as a mixture of absorbers with different absorption maxima, or different absorbers may be applied independently, e.g. one after another, in an alternating manner or in a predetermined sequence. Thus, applying different amounts allows the strength in the construction material to be controlled and to selectively achieve different strengths, e.g. in the molded part to be produced and the jacket surrounding it. The strength ranges from a strength as in the part itself to a strength that is only insignificantly above that of the construction material without the absorber printed thereon. This allows temperature control in the construction field/construction space and also allows easy removal, if desired, of the jacket surrounding the produced part, which jacket serves the purpose of temperature control.

"Absorption" refers to the uptake by the construction material of thermal energy from radiation. The absorption depends on the type of powder and the wavelength of the radiation.

"Energy input means", as used hereinafter, refers to a source of energy input into the construction space or/and the particulate material or/and the areas printed with absorber. This may be, for example, a source of energy for temperature control or heating of particulate material, even before the absorber input. It may also include irradiation of the construction field by stationary or mobile sources of radiation. If the source of radiation is used for solidification after input of the absorber, the absorber is adapted to the type of radiation and preferably optimized. This is intended to produce differences in heating between "activated" and "non-activated" powder. "Activated" means that, by the absorber printed therein, the temperature in these regions is increased as compared to the other regions in the construction space and the particulate material areas not printed with absorber.

"IR heating" as used herein specifically means irradiation of the construction field by an IR radiator. The radiator may be either static or movable over the construction field by a displacement unit. Using the absorber, the IR heating results in different temperature increases in the construction field.

An "IR radiator" is a source of infrared radiation. Usually, incandescent filaments in quartz or ceramic housings are used to generate the radiation. Depending on the materials used, different wavelengths result for the radiation. In addition, the wavelength of this type of radiator also depends on the power output.

An "overhead lamp" or "overhead radiator" in the sense of the invention is a source of radiation mounted above the construction field. It is stationary, but has an adjustable radiant power.

A "sintering lamp" is the energy input means which can heat the process powder (particulate construction material) to above its sintering temperature. It may be stationary. In preferred embodiments, it is moved over the construction field.

"Sintering" or "melting" is the term for the partial coalescence of the particles in the powder. In this system, the build-up of strength is connected with the sintering.

The term "sintering window" refers to the difference in temperature between the melting point occurring when first heating the powder and the solidification point during the subsequent cooling.

The "sintering temperature" is the temperature at which the powder first begins to fuse and bond.

Below the "recrystallization temperature", powder once melted solidifies again and shrinks considerably.

"Recycling rate" refers to the ratio of the amount of particulate material that can be used for a new process cycle after completion of the construction process to the total amount of particulate material required for one process cycle. Particulate materials whose properties change due to the construction process, sometimes require the admixture of an amount of particulate material not used in the process. A typical example is polyamide 12, which is subject to irreversible thermal damage upon heating close to the melting point.

The "packing density" describes the filling of the geometric space by solid matter. It depends on the nature of the particulate material and the application device and is an important initial parameter for the sintering process.

The term "shrinkage" refers to the process of geometric shortening of a dimension of a geometric body as a result of a physical process. As an example, the sintering of suboptimally packed powders is a process resulting in shrinkage with respect to the initial volume. Shrinkage can have a direction assigned to it.

"Deformation" occurs if the body is subject to uneven shrinkage in a physical process. Such deformation may be either reversible or irreversible. Deformation is often related to the global geometry of the component.

The construction material is always applied in a "defined layer" or "layer thickness", which is individually adjusted according to the construction material and the process conditions. It is, for example, 0.05 to 0.5 mm, preferably 0.1 to 0.3 mm.

"Temperature control" refers to the adjustment of a desired temperature in the construction space, which may be kept constant or may be varied cyclically. Preferably, a basic temperature is set to a selected value. "Temperature control" also refers to a desired temperature adjustment of the applied particulate material or the particulate material in the recoater.

The "construction field" in the sense of the invention is understood to be the area of the device onto which the particulate material is applied.

The "recoater" is used to apply particulate material onto the construction field. According to the present invention, the recoater is an oscillating blade recoater. Oscillating blade recoaters are generally known from the prior art. What blade is used, and at what angle, radius, speed, amplitude it oscillates etc. is selected according to the particulate material used and can be specifically adjusted.

The "particulate material roll" is the particulate material which is applied onto the construction field in front of the recoater in the coating direction and, due to the movement of the recoater, forms a particulate material roll moving ahead of the recoater.

"Diameter of the particulate material roll" in the sense of the disclosure is the largest dimension, measured in the direction of application of the roll generated in front of the coater (recoater) and preferably forms a semi- to quarter-circle. It may be 2 to 10 mm, preferably 2 to 4 mm and very preferably 4 mm. This diameter is adapted to the other process conditions and is changed or adjusted depending on the particulate material, particulate material additives, the average particle diameter, the particle diameter distribution, and the flowability of the particulate material.

"Conducting means for air flow conduction" in the sense of the disclosure refers to any suitable means for specifically conducting an air flow in the device into or/and through the construction space, which includes, for example, metal sheets, tubes/hoses, molded plastic parts, molded metal parts, etc.

"Construction units" according to the present invention are all units needed for the construction of the molded part and arranged, at least partly above the construction field. These units include, for example, the recoater, the printer, in some cases also the energy input means, etc. According to the present invention, these are usually units which have to be arranged at a defined distance from the particulate material layer to be applied.

A "reflector means" in the sense of the present invention is a part which reflects radiation, for example a metal sheet or a film which locally directs the radiation of the energy input means used, thereby enabling uniform irradiation of certain surfaces as well as avoiding heat losses in the form of undesired emission.

Various aspects of the invention will be described below.

In one aspect, the invention relates to a method for producing three-dimensional parts, wherein particulate material is applied, layer by layer, onto a construction field, an absorber is selectively applied, the areas with the absorber are solidified by energy input, and these steps are repeated until the three-dimensional part or parts is/are obtained, wherein the particulate material is applied by means of a recoater and the absorber is selectively applied by a print head, the particulate material is solidified by energy input means, wherein the recoater is an oscillating blade recoater having a temperature of 70° C. to 155° C., the particulate material is applied by generating a particulate material roll in front of the recoater in the coating direction, the diameter of the particulate material roll is adjustable, and the particulate material is heated to or kept at a temperature of 155° C. to 180° C. by energy input means during application onto the construction field.

With the method according to the invention, a particularly advantageous combination of different process conditions has been found, which leads to very advantageous process results in a surprising manner and allows the production of high-quality 3D molded parts via the HSS process.

Preferably, the construction field is lowered by a defined amount prior to each particulate material application. It is also possible that the construction units, i.e. the units for which absolutely have to be arranged at a defined distance from the construction field in order to build up the particulate material, are raised by a defined amount, said defined amount preferably corresponding to the layer thickness of the applied particulate material.

Use is made of an absorber which is suited to the other process conditions, said absorber preferably being a liquid, which is preferably an oil-based ink containing carbon particles. An example of a suitable ink is SunChemical Jetstream PC07774 B.

The method according to the invention preferably uses a particulate construction material which has an average particle size of 50-60 μm, preferably 55 μm, a melting temperature of 180-190° C., preferably 186° C., and/or a recrystallization temperature of 140-150° C., preferably 145° C. Examples of such construction materials include the polyamide 12 construction materials PA2200® or Duraform PA®.

The coating cycle is selected to match the other process parameters, and one complete coating cycle takes, for example, 20 to 40s. A "complete coating cycle" is understood to be the operation during which the coater and the printing unit respectively move over the entire surface of the construction field.

The basic temperature is advantageously set to 145° C. to 186° C., preferably 160° C. to 180° C., and/or the sintering temperature is set to 175° C. to 220° C., preferably 190° C. to 210° C.

According to a preferred embodiment, the absorber used is a liquid, preferably an oil-based ink, which contains carbon particles, e.g. SunChemical Jetstream PC07774 B, wherein the absorber preferably comprises radiation-absorbing components, plasticizers for the particulate material or/and one or more substances interfering with recrystallization.

The recoater preferably comprises one or more oscillating blades and a particulate material reservoir. The temperature in the particulate material reservoir of the recoater is advantageously set to 70 to 155° C., preferably 80 to 155° C., more preferably 130 to 155° C. The temperature control of the particulate material in the recoater may be effected by means of heating elements in or on the recoater.

The temperature of the particulate material during application should preferably be 80 to 160° C., preferably 130 to 155° C.

According to a preferred embodiment of the invention, the diameter of the particulate material roll is 1 to 8 mm, preferably 2 to 6 mm, even more preferably 3 to 5 mm.

In this case, it may be advantageous for the dimensions of the particulate material roll to be kept substantially constant during application of the particulate material. Even more preferably, the temperature in the particulate material roll is kept constant during application of the particulate material.

Preferably, an energy input means, which may advantageously be movable as well, is used on or in the area of the recoater.

The energy input may be effected by an energy input means located above the construction field and/or a movable energy input means arranged behind the recoater. According to a preferred embodiment, the energy input by energy input means may also be effected after application of the particulate material.

In this case, the energy input means may be an overhead radiator or/and an IR lamp, for example.

According to a particularly preferred embodiment of the invention, the overhead radiator is adjusted such that a temperature of 30 to 180° C. prevails in the construction space. The temperature conditions are preferably controlled such that a temperature of 160° C. to 190° C., preferably 180° C. to 190° C., is set in the applied particulate material.

In a method according to the invention, particulate material is preferably applied by means of a recoater, followed by selective application of absorber by means of one or more print heads, the energy input is effected by movable and controllable energy input means, preferably directly after application of the particulate material or/and of the absorber, the energy input means is moved over the construction field after the recoater, or/and pre-exposure by means of energy input means is effected before application of the particulate material, and, optionally, the energy input is additionally effected by means of a further energy input means arranged above the construction field, said further energy input means being controllable or being operative throughout the entire process.

According to a particularly preferred embodiment of the invention, a gas flow, preferably an air flow, is passed through the air space of the construction space in order to adjust a desired temperature in the construction space.

In this case, the air flow may be guided into the construction space by conducting means from above or/and laterally, be guided substantially over the construction field or circulate above the construction field and exit from the construction field again upwards or/and laterally.

The temperature in the construction space should preferably be adjusted to 30° C. to 60° C., preferably 30° C. to 40° C. This could also be referred to as generating a cold construction space. These aspects of the cold construction space could also be applied in the known method of laser sintering. For this purpose, the person skilled in the art will perform the modifications to the method and the necessary device features known to the skilled artisan from laser sintering. Accordingly, the skilled person will use a laser lamp for solidification of the particulate material.

A cold construction space may be achieved, for instance, by providing air ducts in the construction space. In one embodiment, constant flow-controlled aspiration (anemometer) and a control unit for said aspiration (e.g. MKFVA320 from Fuchs Umwelttechnik) could be envisaged. Moreover, the cold construction space could be achieved or supported by providing a clearly defined air duct in the process chamber. Metal plates of the overhead radiator may also serve as convection guards.

Controlled and specific pre-heating of the particulate material only in the coater, keeping the quantity of particulate material low and constant, may prevent unnecessary heating of the construction space.

Heating of the powder surface may also be performed by means of a special arrangement of the overhead radiators wherein adapted, computed reflectors are used. This will result in considerably reduced emission of dissipated heat into the construction space.

The irradiation of the powder surface with the sintering radiator may be optimized by taking into consideration the reflectors, the right wavelength or monochromatic radiators, respectively, and the exact timing of machine control (=minimizing the time during which the sintering radiator is active).

If a construction field heating (bottom and walls) is used in the job box, metal walls require a shorter pre-heating time than air in the construction space.

The geometric design of the process chamber walls may be such that the radiative equilibrium (Kirchhoff's law of thermal radiation) keeps the heat loss on the powder surface minimal.

If the coater system is embodied along two separately movable shafts, one each for applying the particulate material (recoater shaft) and the absorber (print head shaft), respectively, then the overhead radiators will be masked only for a short time, which will in turn keep heat losses by heating of machine elements low (shaft system). Advantageously, the shorter masking time of the overhead radiators does not cool the construction field down so much, which does not have to be heated again so much by means of energy input. This results in an advantage in the efficiency of the machine and method.

In another aspect, the invention relates to a device for carrying out a method according to the invention.

In yet another aspect, the invention relates to a device for carrying out a 3D printing method, said device comprising: a. a construction field, b. an oscillating blade recoater with a heating element, c. a print head, d. one or more energy input means, wherein an energy input means is mounted on or next to the recoater so as to be movable along with the latter and, preferably, conducting means for adjusting the construction space temperature by conducting an air flow through the construction space are provided.

According to the present invention, an oscillating blade recoater is used in a layer-building sintering method. Optionally, the attached powder reservoir is provided with a controlled resistance heater so that the powder can be temperature-adjusted in a controlled manner immediately before being applied.

Preferably, there is only a small amount of powder in the recoater, and the recoater is refilled approx. every 10 layers from a large stationary powder reservoir which need not be heated.

The refill rhythm can be changed. For example, a refill would also be possible after each layer, e.g. so that the powder quantity in the powder container attached to the coater and moved along with the latter remains the same for each layer and, consequently, no temperature variations occur within the layer applied onto the construction space.

The coater has a gap through which powder flows out as soon as the oscillating blade vibrates. The size of this gap can be changed by simple tools, so that the use of different particulate materials does not require any machine parts to be exchanged.

In this case, the two energy input means can be mounted above the construction field in a stationary or/and movable manner. Preferably, one energy input means is provided on or next to the oscillating blade recoater in a movable manner.

One energy input means may be, for example an overhead radiator, preferably an overhead ceramic heating element, and one energy input means may be, for example, an IR radiator.

Preferably, one or more reflector means can be mounted above the construction field and the energy input means.

The stroke of the oscillating blade recoater may preferably be generated by means of an eccentric or/and the stroke may have a length of 0.05-0.3 mm, preferably 0.15 mm, or/and the oscillation frequency may be between 30 Hz and 150 Hz or/and the oscillation frequency may be electronically controllable. 50 to 80 Hz are preferred.

Electronically adjusting the oscillation frequency of the coater allows the powder discharge quantity to be specifically influenced during the coating procedure. There is an approximately linear correlation between the powder discharge and the frequency. Thus, it is possible, when changing to a particulate material which differs in rheological properties, to effect an adaptation by means of software presettings without having to intervene mechanically.

The following table indicates the values of preferred oscillation frequencies by way of example.

| Particulate material (d50 = 55 μm) | EOS PA2200 | Duraform HST | Evonik PA12 without flow enhancer |
|---|---|---|---|
| Powder roll diameter [mm] | 2-4 | 1-3 | 3-5 |
| Amplitude/stroke [mm] | | constant at 0.1-0.2 | |
| Temperature [° C.] | | 70-80° C. | |
| Frequency [Hz] for 4 mm powder roll | 45-55 | 55-65 | 40-50 |
| Amplitude/stroke [mm] | | constant at 0.1-0.2 | |
| Temperature [° C.] | | 70-80° C. | |

Furthermore, the angular position of the powder outlet of the coater may be changed, allowing varying degrees of compression to be achieved for the powder during coating (downward force effect possible). In this manner, it is possible to influence the bulk density of the resulting molded articles.

In a method and a device according to the invention, the particulate material exiting from the coater gap, the so-called powder roll, always remains constant in quantity (and also in temperature, in the case of a heated reservoir) during coating. This keeps the heat dissipation from the hotter construction field surface to the usually colder powder roll constant during coating. Therefore, compared to the prior art, there is no change in temperature on the powder surface during coating. Hence, there will be identical physical and geometrical properties for the resulting molded articles as well, regardless of their position in the construction field.

Due to the constant size of the powder roll, the force effect on the powder surface of the construction volume also remains constant during coating.

Matching the gap size and the vibration frequency can keep the amount of powder being discharged during the coating process minimal (=small powder roll). In this manner, the contact surface with the already applied amount of powder of previous layers can be specifically minimized. Both the amount of heat dissipated away from the construction volume and shear forces can thus be kept low. This makes the coating process less prone to error and increases the bonding of the individual layers with each other, which leads to improved strength of the molded article (e.g. increase in elongation at break by a factor of 1.5).

Since particulate material is not discharged until the coater is made to vibrate, and the vibration can be controlled electrically, particulate material can be specifically applied only where this is actually desired.

Any errors occurring during coating, e.g. when a part of the area is not covered with particulate material, are equalized automatically, without intervention of a regulating mechanism, when applying the next layer, because the amount of particulate material of the powder roll then initially decreases, but only until the gap is no longer covered and, consequently, particulate material flows out of the attached container. Since both processes balance each other, the layer application will automatically stabilize in the case of an error.

In this case, the stroke of the oscillating blade recoater can be generated electrically, electrodynamically, electrostatically, pneumatically, hydraulically or/and by a linear motor. Particularly preferably, the generation of the stroke of the or/and oscillating blade recoater is embodied as a plunger coil or/and is controlled by frequency-dependent current-voltage analysis or/and is controlled by means of an acceleration sensor to have a constant stroke and frequency or/and stroke and frequency are embodied so as to be electronically adjustable.

Surprisingly, using the above process parameters in the combination shown, very advantageous process results were achieved.

With the method and the device according to the invention, the above-described problems or disadvantages are at least reduced or avoided completely. The construction and material cost can be reduced and sensitive components (print head, sensors etc.) can be protected.

Furthermore, the effort required to ensure machine safety is minimized. Construction and material costs are kept low.

Moreover, the printing conditions are kept stable throughout the construction process.

Cooling of the absorber fluid is possible without condensation occurring at the print head dosing unit, because the absorber fluid can be kept at a constant, low temperature. This enables stable processing (viscosity, chemical stability).

The ink can be constantly kept at a relatively low temperature (approx. 40° C. to 50° C.). This results in uniform part properties, because the rheological properties of an ink are temperature-dependent. For instance, at higher temperature, the ink input may increase or the print quality decreases.

Due to the short machine heating times now possible, the part properties also remain approximately the same throughout the entire print job.

The construction material may be present in any suitable form and with agents that can be applied by the device. The device used for the method may be adapted to the construction materials by suitable means and also constructionally, by known means. The construction material is preferably used in the form of a powder or dispersion.

Further aspects of the disclosure will be described below.

The prior art method consists of the steps of layering, printing, exposure to radiation and lowering. The first step is analogous to the layering in known powder-based 3D printing. Powder is placed in front of a blade, applied onto a construction platform and smoothened by the blade. In this case, the layer thickness determines the positions of the construction platform in two successive coating operations.

Next, the layer is printed. In the method mentioned here, liquids are applied by an inkjet print head. Part of the liquid is an absorber which causes local heating of the powder upon exposure to radiation. Alternatively, the absorber may also be a powder, preferably a carbon toner, which is selectively applied in a suitable manner.

The layer thus printed is then scanned by a radiation source and thereby selectively heated. In the process, the entire powder is heated by the source of radiation. However, the temperature increases particularly in activated areas such that the particles begin to sinter and thereby bond.

After this step, the construction field is lowered by one layer thickness. All of the above-mentioned steps are then repeated, or optionally the coating elements are raised, until the desired part is obtained.

The present invention will be explained in more detail below, with reference to examples representing preferred embodiments.

FIG. 1 shows a device for application of particulate material comprising a blade coater (001) according to the prior art. At the start of the coating process (see FIG. 1a), the blade coater is positioned on the edge of the construction field of a construction platform (005) to apply particulate material (003) from which a molded article is to be formed. A powder roll (006) forms in front of the blade coater (001).

Figure 1B:
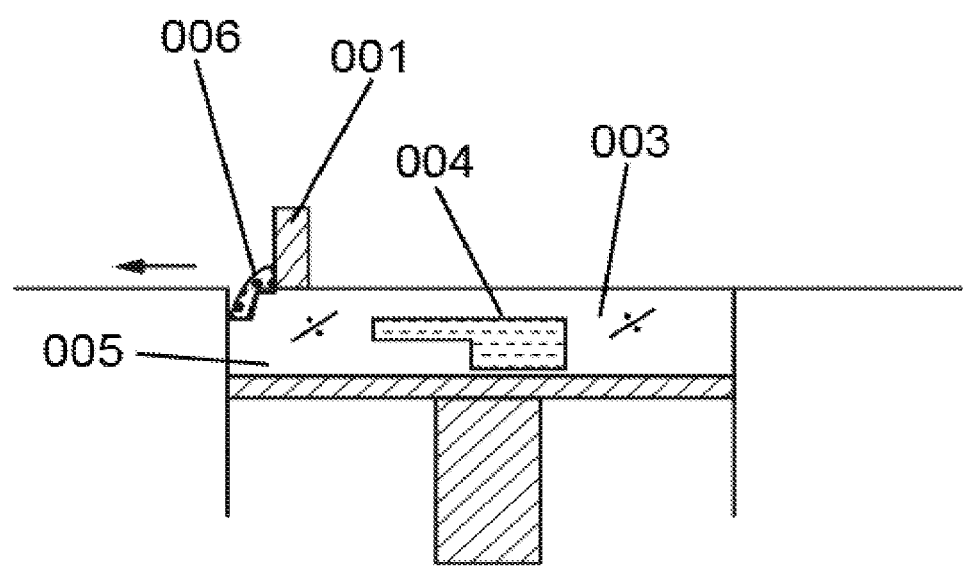

FIG. 1b shows the coating process towards the end of a coater movement. As is clearly recognizable, the powder roll (006) has become smaller.

Figure 2:
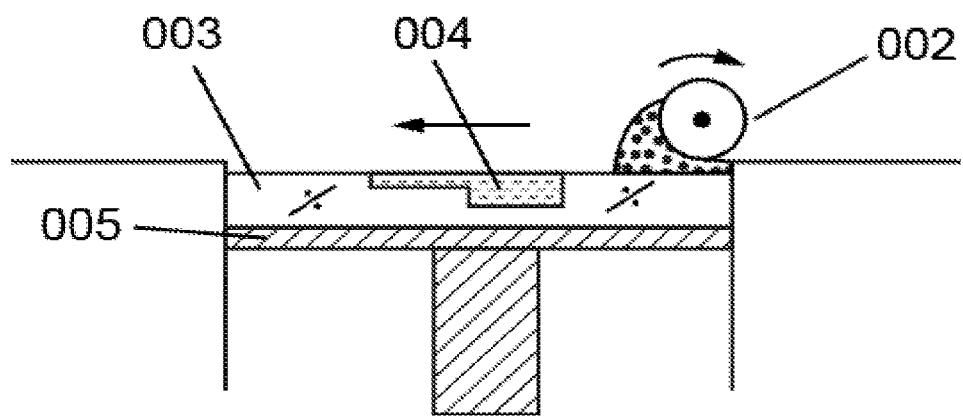
FIG. 2 shows a prior art device for application of particulate material, embodied by a roller coater.

A further prior art device for applying particulate material (003) is shown in FIG. 2. Here, a roller coater (002) is used instead of the blade coater.

Figure 3:
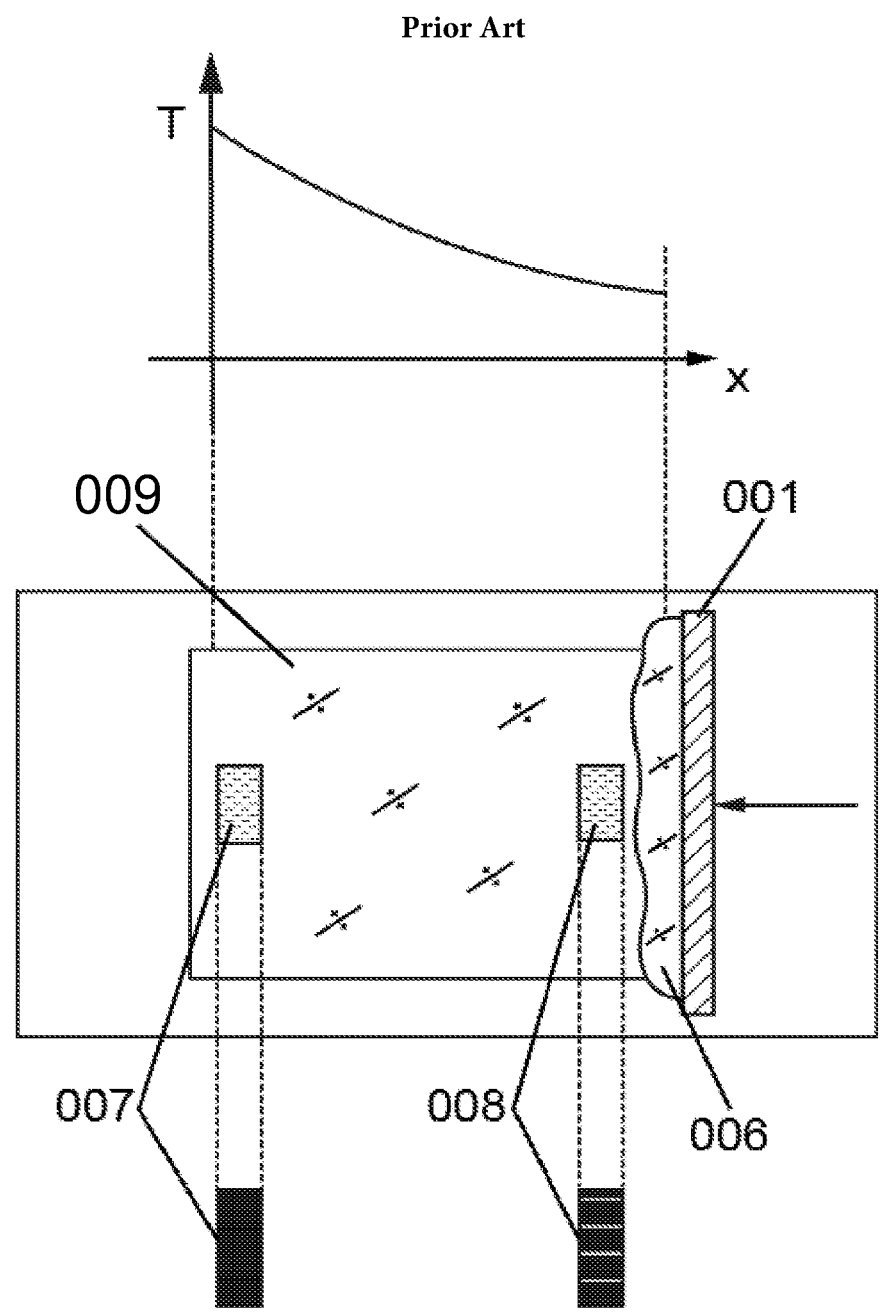
FIG. 3 is a schematic view of the resulting temperature profile on the particulate material surface when using a coater according to the prior art, with the particulate material surface viewed from above and the resulting molded article shown in a lateral view.

FIG. 3 is a view of the temperature profile on the particulate material surface using a coater according to the prior art. Also, the particulate material surface (009) is shown from above and, further, resulting molded articles (004) are shown in a lateral view. It can be concluded that a lower temperature results in molded articles with poor interlaminar bonding (008), while at higher temperatures, the molded articles exhibit high interlaminar bonding (007).

Figure 4A:
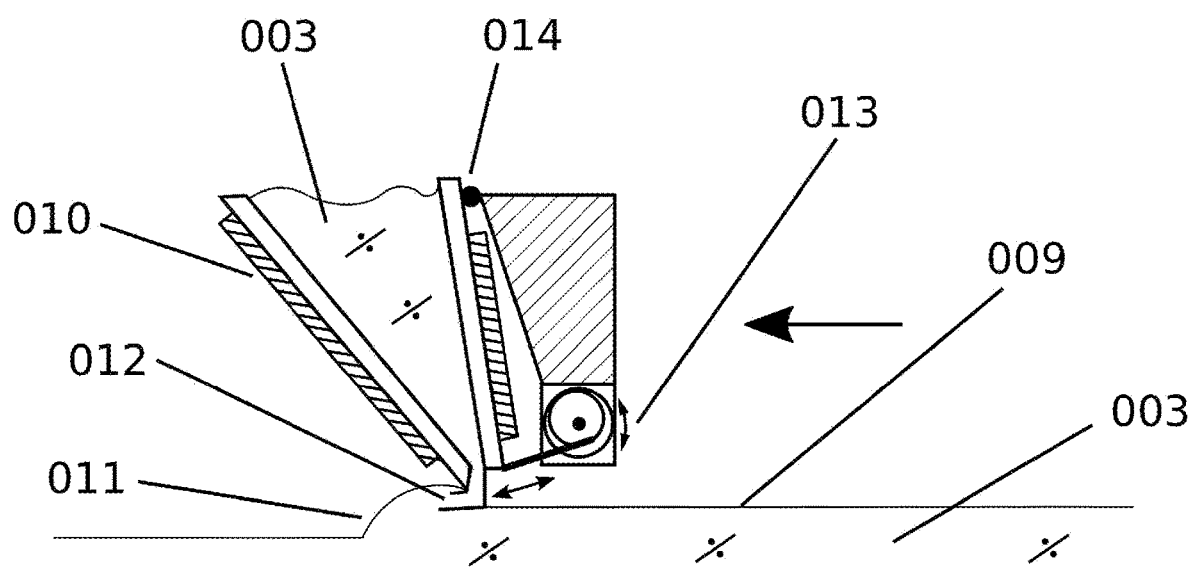
FIG. 4 is a detailed schematic view of the device according to a preferred embodiment of the invention of the oscillating blade coater, a) during application of the particulate material, b) during filling, c) showing detailed execution of the movement of the particulate material during the coating procedure.
Figure 4B:
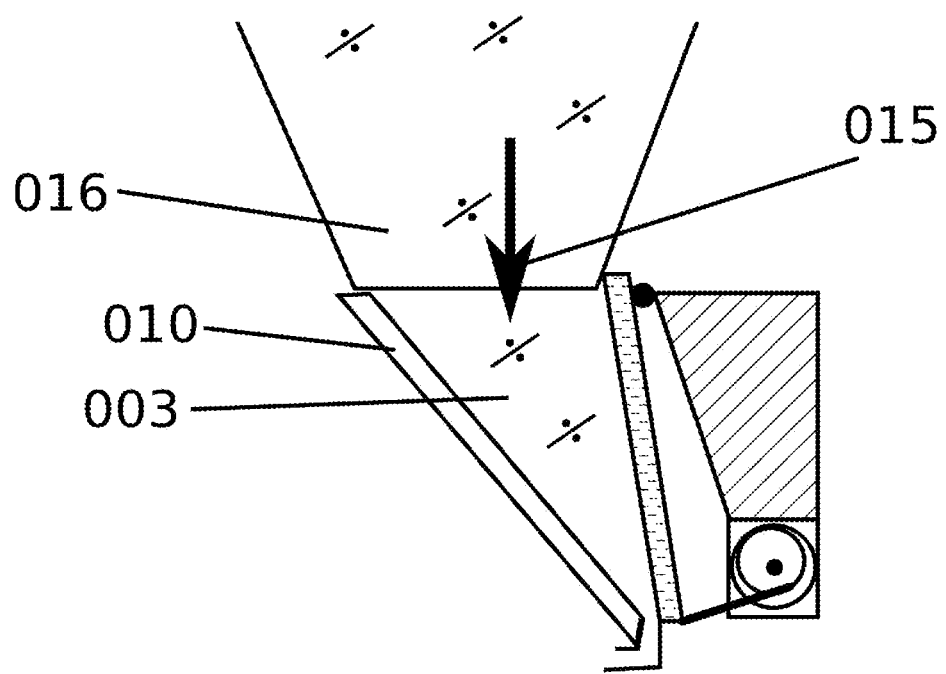

A detailed schematic view of the device according to a preferred embodiment of the invention of the oscillating blade coater is shown in FIG. 4. The example shown is a device for particulate material coating using a heated oscillating blade recoater.

FIG. 4a) is an exemplary schematic view of a device for particulate material coating. The schematic shows an oscillating blade recoater during particulate material application. In terms of construction, the oscillating blade recoater is substantially characterized in that it comprises a container including the particulate material (003) to be applied, said particulate material (003) being made to oscillate by means of the rotary motion of an eccentric (013) with a stroke of between 0.02 to 0.3, preferably between 0.05 and 0.2, particularly preferably between 0.07 and 0.15 mm. In this case, the rotary joint (014) characterizes the center of rotation of the oscillatory motion. The particulate material (003) moved along is thereby made to vibrate, which strongly increases its flowability. This results in the particulate material (003) being discharged from the storage container until the discharged powder covers the gap (012) by means of the powder roll (011) thus formed. If the coater is now moved over the lowered construction platform (005) in the direction of the arrow, the space between the coater and the powder surface (009) will be filled with particulate material (003) of the powder roll (011) moved along. The amount of particulate material (003) of the powder roll (011) thus decreases until the gap (012) is no longer covered and thus further particulate material (003) flows out of the container moved along. Since both processes balance each other, the size of the powder roll (011) always remains constant. Further, a resistance heater (010) keeps the supply of particulate material (003) at a constant elevated temperature, preferably between 80° C. and 180° C., particularly preferably between 90° C. and 170° C., particularly preferably between 130° C. and 150° C. Due to the constant amount flowing out of the particulate material container and the resulting constant size of the powder roll during the coating process, the heat removed due to the temperature difference to the particulate material surface (009) is always constant. This obviates the need to add a flow agent to the particulate material, as frequently done in the prior art, which improves the handling and stability of the coating process, because errors in material dosage, e.g. by aggregation, are thus reduced considerably.

FIG. 4 b) shows a device for filling the particulate material coater by means of level filling (015). In this case, the filling of the particulate material reservoir of the oscillating blade coater is schematically outlined. The process depicted here is called level filling (015). Particulate material (016) which is not temperature-controlled and flows out of the reservoir, whose position in the device is preferably the same as the rest position of the oscillating blade coater, flows into the container moved along by the coater until the container is completely filled. Filling preferably takes place during the application of the absorber by means of the print head shaft, thus avoiding any lost time. The advantage of level filling is that is always results in the same amount of particulate material being refilled. Thus, without any complex control, the dwell time of the particulate material in the container moved along remains constant, which results in the temperature of the particulate material being constant over time due to a constant heating rate of the container. The size of the container attached to the coater and carrying the particulate material (003) is preferably selected such that it can accommodate material for multiple coating procedures. Also, the refill rate in the rest position is preferably selected to be higher than the material flow resulting from the dosing rate of the coater, which guarantees that the dwell time of the particulate material in the coater is sufficient to homogenously heat the particulate material to the desired temperature.

Figure 4C:
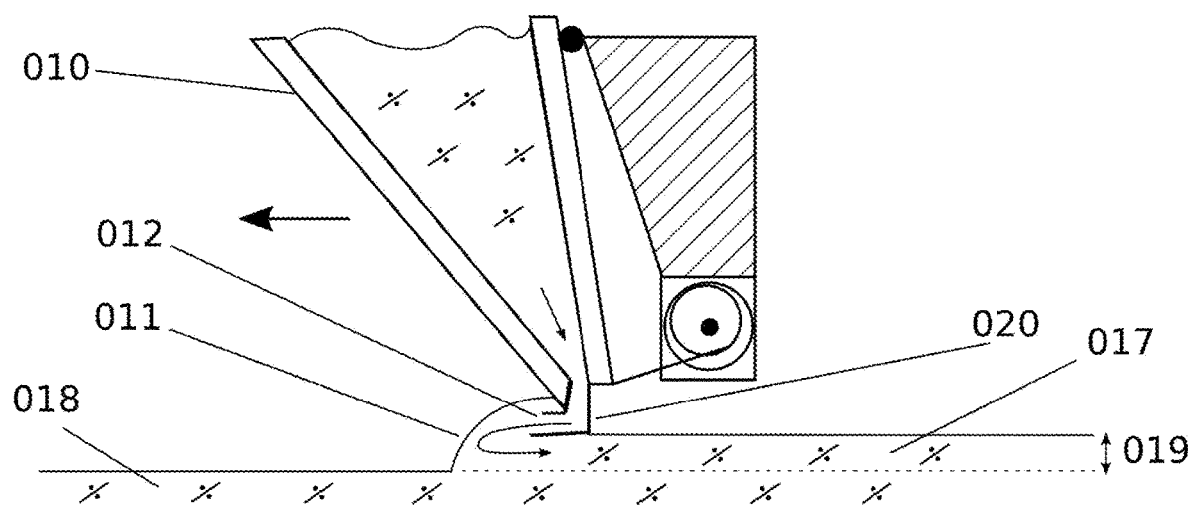

FIG. 4c) shows a detailed execution of the movement of the particulate material during the coating procedure. A new particulate material layer (019) is applied onto the construction space surface (018) using a leveling blade (020).

Figure 5:
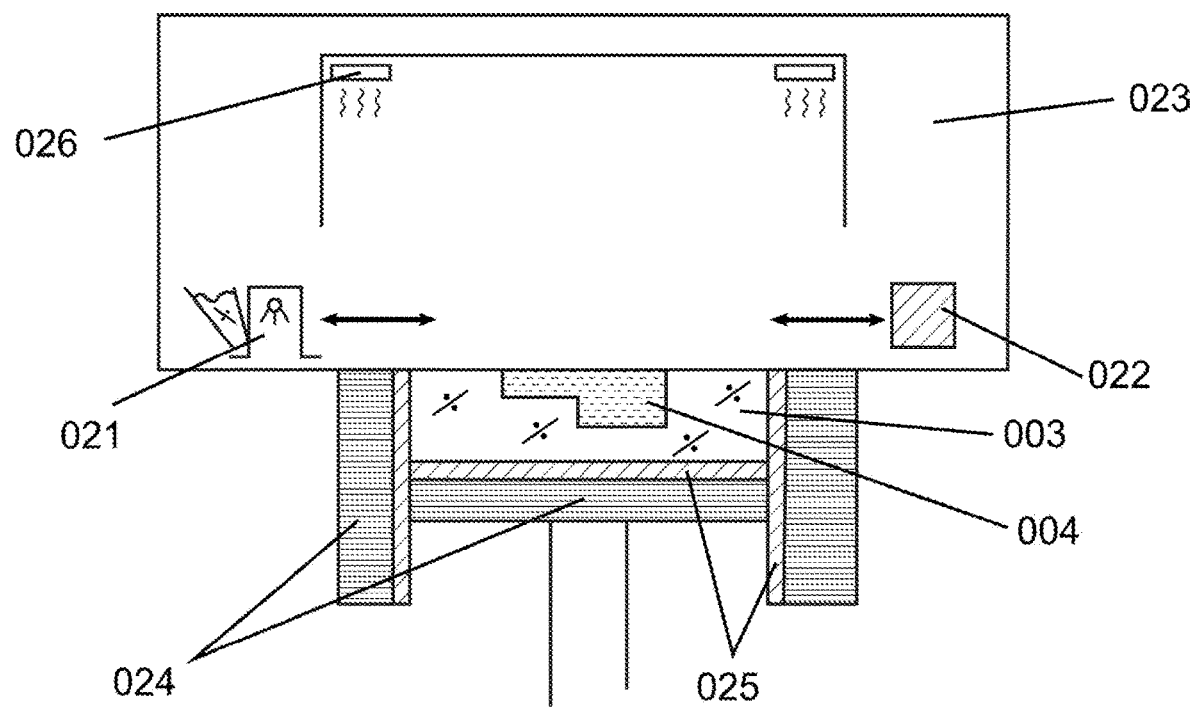
FIG. 5 shows another preferred embodiment of a device for generativ production of molded articles using temperature-controlled particulate material.

A device for producing three-dimensional parts (004) in a cold process chamber (023) is shown in FIG. 5 in simplified, schematic form. The required temperature control of the surface of the particulate material (003) is effected by means of the following elements: a controlled resistance heater (025) ensures a temporally and spatially constant temperature of 170° C. within the applied particulate material (003), e.g.: a PA12, preferably PA2200 or Duraform PA, including the already produced part of the molded article (004). (024) schematically refers to a thermal insulation. In this case, an overhead radiator (026) ensures the homogeneous distribution of the surface temperature of 170° C. of the particulate material both temporally and spatially. The coater unit (021) is preferably embodied by a resistance heater in order to pre-heat particulate material carried in a container before coating. The print head (022) is then in the rest position outside the influence of the heating elements in the process chamber (023) which has a temperature of 40° C.

Figure 6:
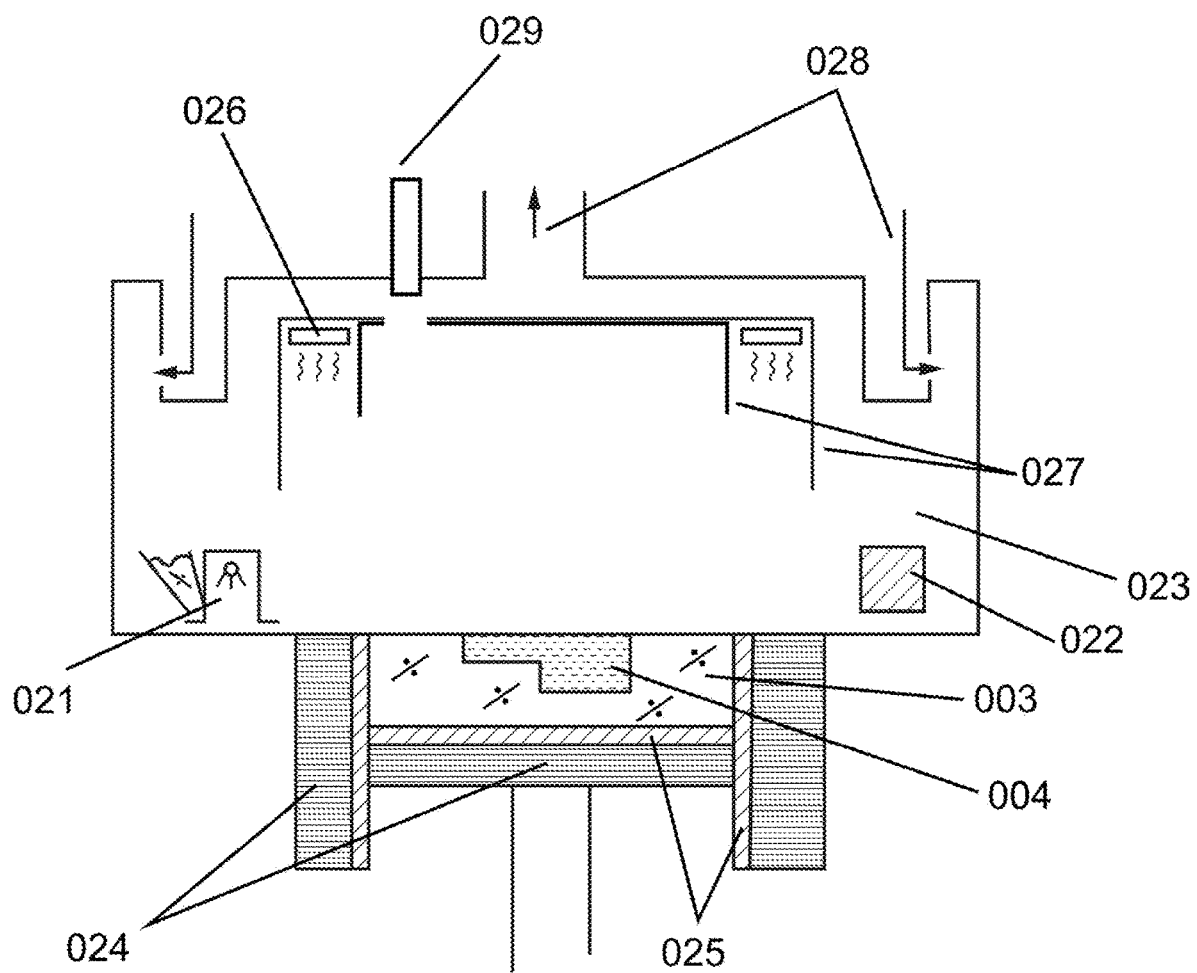
FIG. 6 is a detailed schematic view of the air duct of a device with a cold construction space according to a preferred embodiment of the invention.

FIG. 6 shows, in more detail, an air duct (028) in the process chamber (23), as well as reflectors or the convection protection (027), respectively, configured as part of the overhead radiator units (026). A pyrometer (029) measures the temperature of the powder surface once per layer and adjusts the power output of the overhead radiator such that a constant temperature can be achieved on said surface.

Figure 7:
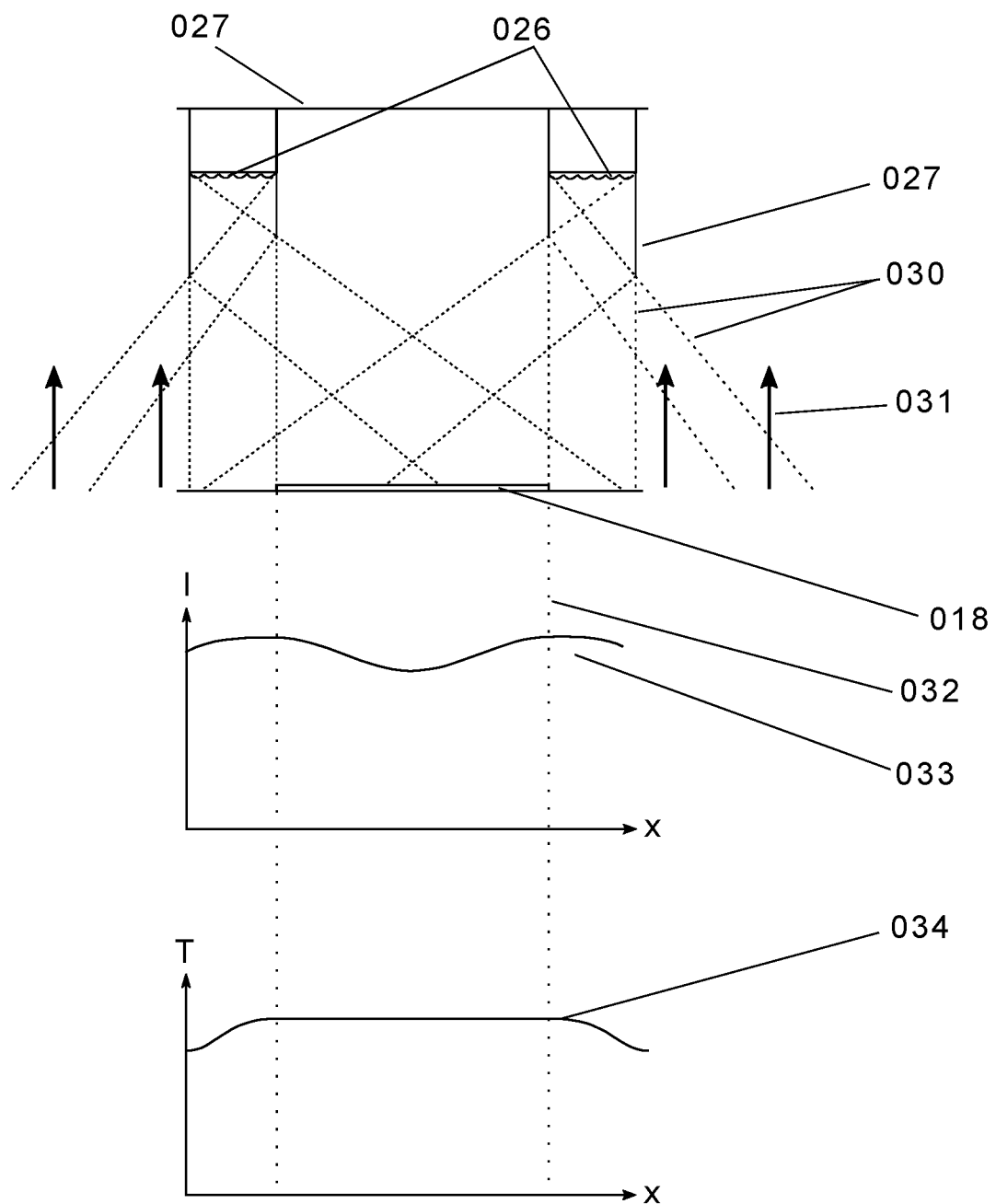
FIG. 7 is a detailed schematic view of a possible construction of an overhead radiator unit with a resulting beam path, resulting radiation intensity and subsequent temperature profile on the powder surface.

FIG. 7 schematically shows a possible construction of the beam reflectors. The beam path is schematically shown at (030), as is the resulting radiation intensity (033) on the powder surface, wherein (032) refers to the edge of the powder surface, as well as the temperature profile (034). This is because the radiative equilibrium of absorbed and emitted radiation according to Kirchhoff's law applies here:

$$\frac{L_{\Omega\nu}(\beta, \varphi, \nu, T)}{a'_\nu(\beta, \varphi, \nu, T)} = L^\circ_{\Omega\nu}(\nu, T)$$

Figure 8:
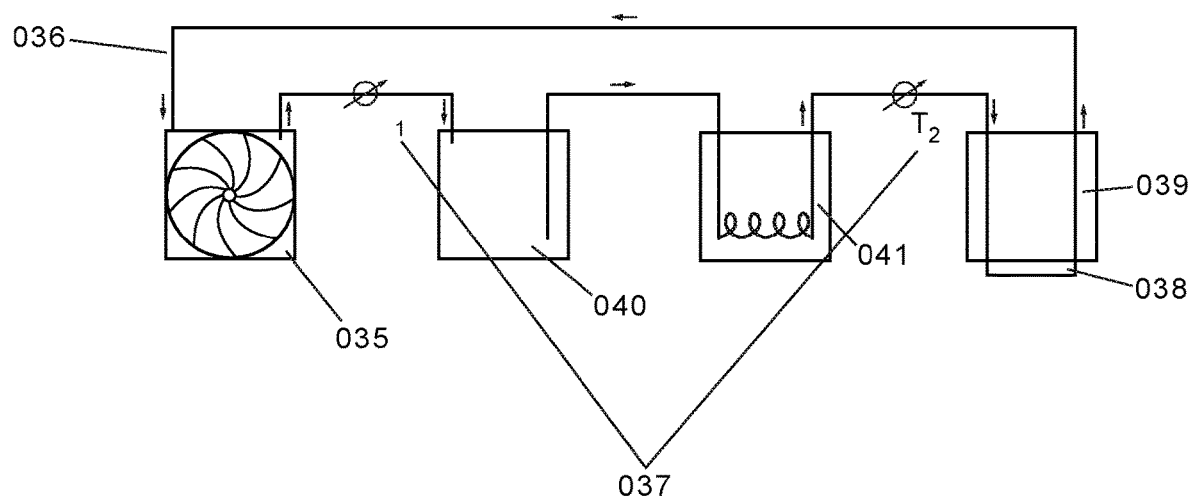
FIG. 8 is a schematic view of a system for temperature control of the absorber fluid according to a preferred embodiment of the invention.

FIG. 8 schematically shows a system for temperature control of the absorber fluid. In the system described, the absorber fluid is constantly circulated during a construction process so that a homogeneous temperature of the fluid can be achieved. In this case, the fluid is first conducted from the fluid reservoir (040) via fluid lines (036) through a continuous flow heating element (041) which can ensure a minimum temperature of the fluid from the start of a construction process. After this, the absorber is conducted into the print head (039) and selectively applied onto the construction field via an inkjet module (038). The fluid heats up due to the temperatures in the print head and is therefore subsequently guided through a cooling unit (035). Next, the fluid is fed back to the fluid reservoir again. In order to control the fluid temperature, the latter is constantly measured by temperature sensors (037) at the supply line to the print head and at the recirculation line to the fluid reservoir.

Figure 9A:
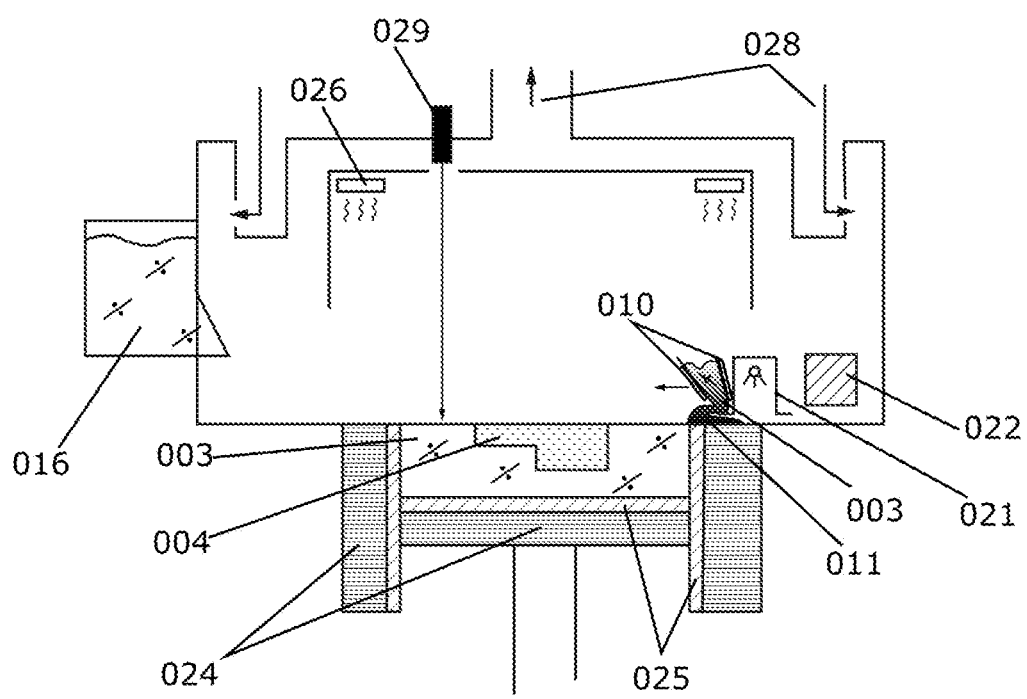
FIG. 9 is a schematic view of a construction space with temperature specifications for a preferred embodiment of the invention.
Figure 9B:
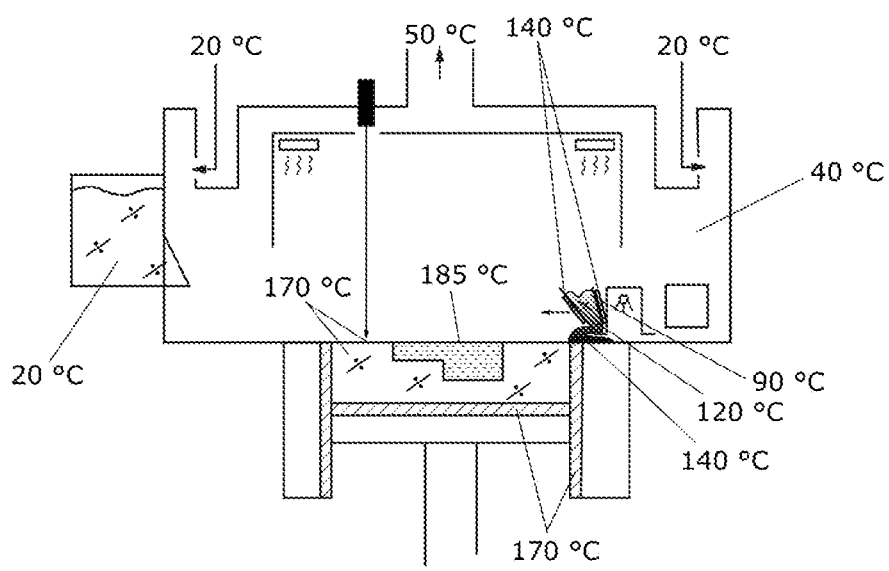

FIG. 9 schematically shows the temperature conditions in a device for producing three-dimensional parts according to FIG. 5. In FIG. 9*a*), the individual components of the device are identified, and FIG. 9*b*) shows an overview of the usual temperatures of the individual components during a construction process. The function of the individual components was already described in FIG. 5.

In the construction container of the device, loose particulate material (003) and molded articles are present, which usually reach temperatures of 170° C. during a construction process. The surface of a molded article briefly reaches higher temperatures of approximately 185° C. during the energy input. After the energy input and after a new layer has been generated, the temperature of the molded article wetted with absorber gradually adjusts to the particulate material surrounding the molded article. The temperature of the surface of the loose particulate material is measured using a pyrometer (029) and is at 170° C. like the rest of the loose particulate material. The resistance heater for temperature control of the construction container (025) also has a temperature of 170° C. The particulate material (016) that is not temperature-controlled in the reservoir has a temperature near room temperature, i.e. approximately 20° C. The oscillating blade recoater with the sintering radiator (021) attached to it is heated to a temperature of e.g. 140° C. via a resistance heater (010). The particulate material present in the recoater thereby reaches temperatures which range from approximately 90° C. in the upper part of the recoater to 120° C. in its central part and up to 140° C. in the exiting powder roll (011). During the construction process, the print head (022) and the process chamber have temperatures of approximately 40° C. In combination with the resistance heater, the insulation (024) keeps the construction container at the desired temperature. The air introduced through the air duct (028) is approximately at room temperature, i.e. 20° C. When discharged from the construction space again, the air has a temperature of approximately 50° C.

Figure 10:
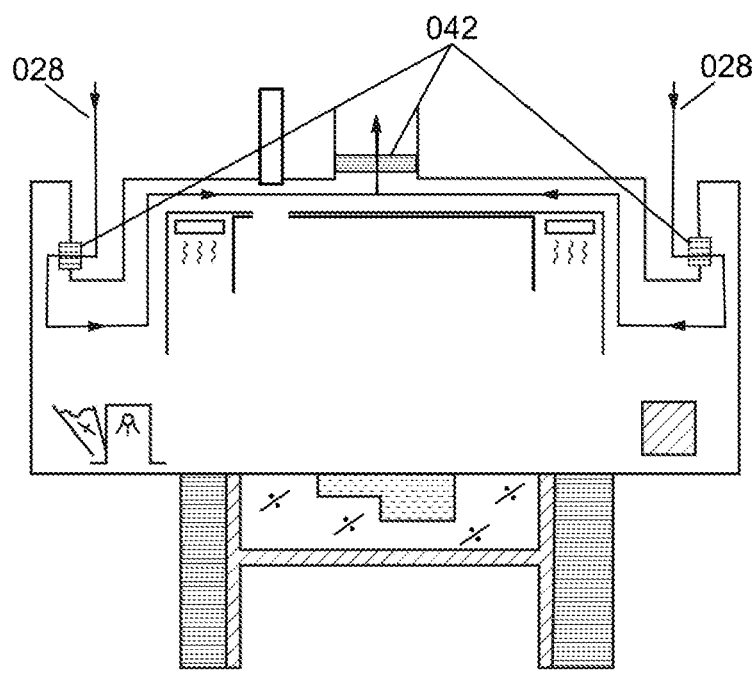
FIG. 10 is a schematic view of the air duct in the construction space according to a preferred embodiment.

FIG. 10 shows the air duct (028) in a device for producing three-dimensional parts in more detail. The air flow, being measured by means of an anemometer (042), is introduced from above on both sides of the device. Via conducting means, the air flow is conducted above the energy input means fixed in the upper part of the device and is evacuated again upwards from the centre of the device, where the air flow is in turn measured by means of an anemometer.

Figure 11A:
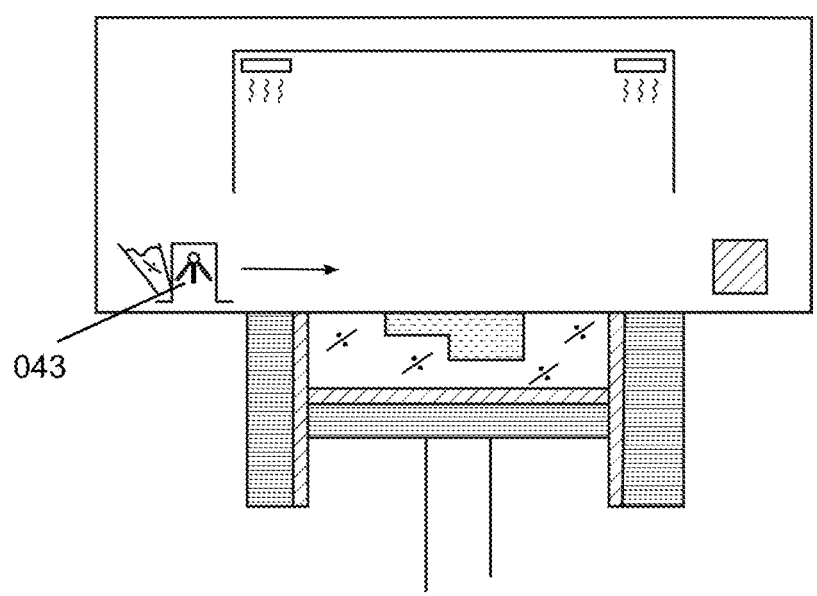
FIG. 11 is a view of a device according to the invention with the power output of a sintering radiator, a) during sintering and b) during recoating.
Figure 11B:
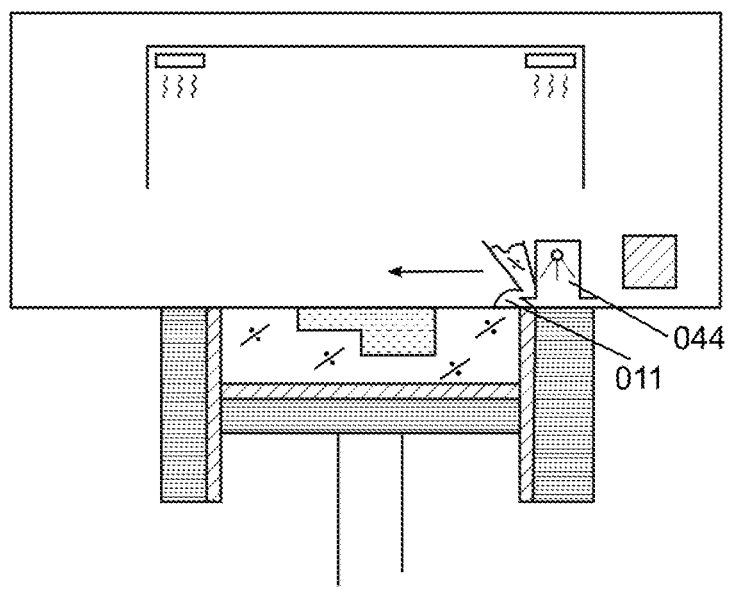

FIG. 11 shows a device according to the invention with the power output of a sintering radiator. The power output during the sintering process is shown in FIG. 11*a*). In this case, the blade coater on which the sintering radiator is present, moves over a powder layer onto which absorber was added just before. In order to trigger the sintering process and, thus the solidification of a molded article, the sintering radiator is operated at its maximum power output (043). FIG. 11*b*) shows the power output of the sintering radiator during recoating. In this case, a new layer is applied via a powder roll (011) in the coating direction. The sintering radiator arranged behind the coater is operated at reduced power output (044) in this case, so as to immediately bring the freshly applied powder to process temperature.

LIST OF REFERENCE NUMERALS

001 blade coater
002 roller coater
003 particulate material
004 molded article
005 construction platform
006 powder roll
007 molded article with high interlaminar bonding
008 molded article with poor interlaminar bonding
009 powder surface
010 resistance heater
011 powder roll
012 dosing gap
013 eccentric
014 rotary joint
015 filling level
016 particulate material without temperature control
018 construction space surface
019 applied layer
020 leveling blade
021 oscillating blade recoater with sintering radiator
022 print head
023 process chamber
024 insulation
025 resistance heater
026 overhead radiator
027 reflector panels/convection protection
028 air duct
029 pyrometer
030 beam path
031 convection
032 construction field boundary
033 radiation intensity
034 temperature of the powder surface
035 cooling unit
036 fluid duct
037 temperature sensor
038 inkjet module
039 print head
040 fluid reservoir
041 continuous flow heating element
042 anemometer
043 sintering radiator, full power output
044 sintering radiator, reduced power output

What is claimed is:

1. A method for producing one or more three-dimensional parts comprising the steps of:
    applying a layer of a particulate material onto a construction field with a recoater, the recoater having a controlled heater for heating the particulate material in the recoater, wherein the particulate material is characterized by a sintering temperature and a recrystallization temperature, and is applied by generating a particulate material roll in a coating direction;
    selectively applying an absorber to one or more areas of the layer with a print head,
    fusing the areas with the absorber by an energy input component,
    wherein these steps are repeated until the one or more three-dimensional part or parts are obtained, wherein the method includes independently
i) heating and controlling the particulate material in the recoater to a temperature of 90° C. to 155° C. with the controlled heater; and
ii) heating and controlling the particulate material on the construction field to a temperature of 155° C. to 180° C. by the energy input component during the repeated layer application onto the construction field;
wherein the absorber causes the particulate material printed with the absorber to reach a temperature such that said particulate material begins to sinter and thereby bond, while the particulate material without the absorber is maintained above the recrystallization temperature and below the sintering temperature and does not sinter;
wherein the method is a high speed sintering method;
wherein the particulate material roll has a generally constant dimension in a direction of application of the roll, wherein the generally constant dimension is preselected in the range of 2 to 10 mm; and
wherein the layer has a generally constant thickness, preselected in a range of 0.05 to 0.5 mm.

2. The method according to claim 1, wherein, before each application of the particulate material, the construction field is lowered by a defined amount or construction units are raised by a defined amount, wherein said defined amount corresponds to the layer thickness of the applied particulate material.

3. The method of claim 1, wherein the energy input component is located above the construction field.

4. The method according to claim 3, wherein the energy input by the energy input component is effected after application of the particulate material.

5. The method of claim 1, wherein the energy input component is an overhead radiator or/and an infrared lamp.

6. The method of claim 5, wherein the construction field is an area of a construction space, and the overhead radiator is adjusted to generate a temperature of 30 to 180° C. in the construction space and in the applied particulate material.

7. The method of claim 1, wherein the energy input component is movable and controllable.

8. The method of claim 7, wherein the energy input is effected directly after application of the particulate material and/or the absorber, and the energy input component is moved over the construction field after the recoater.

9. The method of claim 7, wherein a pre-exposure is effected by the energy input component before application of the particulate material and the energy input is additionally effected by an additional energy input component arranged above the construction field, wherein the additional energy input component is controllable or is operative throughout the method.

10. The method of claim 1, wherein the one or more three-dimensional parts are produced in a process chamber having a construction space and a temperature of the construction space is 30° C. to 60° C.

11. The method of claim 10, wherein a gas flow is conducted into the construction space by one or more conducting components from above or/and laterally, the gas flow is conducted substantially over the construction field or the gas flow circulates above the construction field and exits from the construction field again upwards or/and laterally.

12. The method of claim 1,
wherein the particulate material has
i) an average particle size of 50-60 μm,
ii) a melting temperature of 180-190° C., and
iii) a recrystallization temperature of 140-150° C.;
wherein the absorber is a liquid containing carbon particles;
wherein the recoater comprises one or more oscillating blades and a particulate material reservoir;
and
wherein the particulate material roll is in a form of about a half circle to about a quarter circle.

13. The method of claim 12, wherein the absorber comprises
one or more radiation-absorbing components; and
a plasticizers for the particulate material.

14. The method of claim 12,
wherein a diameter of the particulate material roll is from 2 to 6 mm;
wherein the diameter of the particulate material roll is kept substantially constant during application of the particulate material;
wherein a temperature in the particulate material roll is kept constant during application of the particulate material, and
wherein the energy input component is movable and is used on or in the area of the recoater.

15. The method of claim 1, wherein
the particulate material includes a polyamide;
wherein the one or more three-dimensional parts are produced in a process chamber having an air space, and the method includes flowing a gas through the air space having a temperature of 30° C. to 60° C.;
the recoater is an oscillating blade recoater; and
the particulate material in the recoater is heated to a temperature of 122° C. to 155° C.

16. The method of claim 1, wherein the recoater is an oscillating blade recoater and the temperature of the oscillating blade recoater is 130° C. to 155° C.;
wherein a fluid in the print head has a temperature of about 40° C. to about 50° C.

17. The method of claim 1, wherein the energy input component heats the particulate material on the construction field having applied absorber to a sintering temperature of 175° C. to 220° C. and heats the particulate material on the construction field without applied absorber to a basic temperature of 160° C. to 180° C.

18. The method of claim 1, wherein the method includes filling the recoater with particulate material from a reservoir without temperature control.

19. A method for producing one or more three-dimensional parts comprising the steps of:
applying a layer of a particulate material onto a construction field,
selectively applying an absorber to one or more areas of the layer,
fusing the areas with the absorber by an energy input component,
wherein these steps are repeated until the one or more three-dimensional parts are obtained,
wherein the particulate material is applied by a recoater and the absorber is selectively applied by a print head, the particulate material is solidified by the energy input component, wherein the recoater includes a resistance heater or other heating element and is an oscillating blade recoater and the temperature of the particulate material in the recoater is controlled to a temperature of 70° C. to 155° C., the particulate material is applied by generating a particulate material roll in front of the recoater in the coating direction, the diameter of the particulate material roll is adjustable, and the particulate material is heated to or kept at a temperature of 155° C. to 180° C. by the energy input component during the repeated layer application onto the construction field, and wherein the recoater requires repeated refilling from a stationary powder reservoir while producing the one or more three-dimensional parts;

wherein the one or more three-dimensional parts are produced in a process chamber having an air space, the construction field is an area of a construction space, wherein a gas flow is conducted through the air space over the construction field in order to adjust a desired temperature of 30° C. to 60° C. in the construction space;

wherein the method is a high speed sintering method;

wherein the particulate material roll has a generally constant dimension in a direction of application of the roll, wherein the generally constant dimension is preselected in the range of 2 to 10 mm;

wherein the layer has a generally constant thickness, preselected in a range of 0.05 to 0.5 mm.

20. The method of claim 19, wherein all of the applied particulate material is kept at a basic temperature of 145° C. to 186° C., and the fusing is at a temperature of 175° C. to 220° C.;

wherein the particulate material in the stationary powder reservoir has a temperature of about room temperature or a temperature of about 20° C.

21. A method for producing one or more three-dimensional parts comprising the steps of:

applying a layer of a particulate material onto a construction field, selectively applying an absorber to one or more areas of the layer, fusing the areas with the absorber by an energy input component, wherein these steps are repeated until the one or more three-dimensional parts are obtained, wherein the particulate material is applied by a recoater and the absorber is selectively applied by a print head, the particulate material is solidified by the energy input component, wherein the recoater is an oscillating blade recoater and temperature of the particulate material in the recoater is controlled to 70° C. to 155° C., the particulate material is applied by generating a particulate material roll in front of the recoater in the coating direction, the diameter of the particulate material roll is adjustable, and the particulate material is heated to or kept at a temperature of 155° C. to 180° C. by the energy input component during the repeated layer application onto the construction field;

wherein the one or more three-dimensional parts are produced in a process chamber having an air space, the construction field is an area of a construction space, wherein a gas flow is conducted through the air space over the construction field in order to adjust a desired temperature of 30° C. to 60° C. in the construction space;

wherein the method is a high speed sintering method;

wherein the particulate material roll has a generally constant dimension in a direction of application of the roll, wherein the generally constant dimension is preselected in the a recrystallization temperature, and is applied wherein the layer has a generally constant thickness, preselected in a range of 0.05 to 0.5 mm.

* * * * *

UNITED STATES PATENT AND TRADEMARK OFFICE
CERTIFICATE OF CORRECTION

PATENT NO. : 12,208,572 B2
APPLICATION NO. : 16/062269
DATED : January 28, 2025
INVENTOR(S) : Daniel Günther et al.

Page 1 of 1

It is certified that error appears in the above-identified patent and that said Letters Patent is hereby corrected as shown below:

In the Claims

Column 22, Lines 28-32:
Delete "is preselected in the a recrystallization temperature, and is applied wherein the layer has a generally constant thickness, preselected in a range of 0.05 to 0.5mm."
Insert --is preselected in the range of 2 to 10 mm; wherein the layer has a generally constant thickness, preselected in a range of 0.05 to .05mm.--

Signed and Sealed this
Fourth Day of November, 2025

John A. Squires
*Director of the United States Patent and Trademark Office*